Patented Nov. 20, 1928.

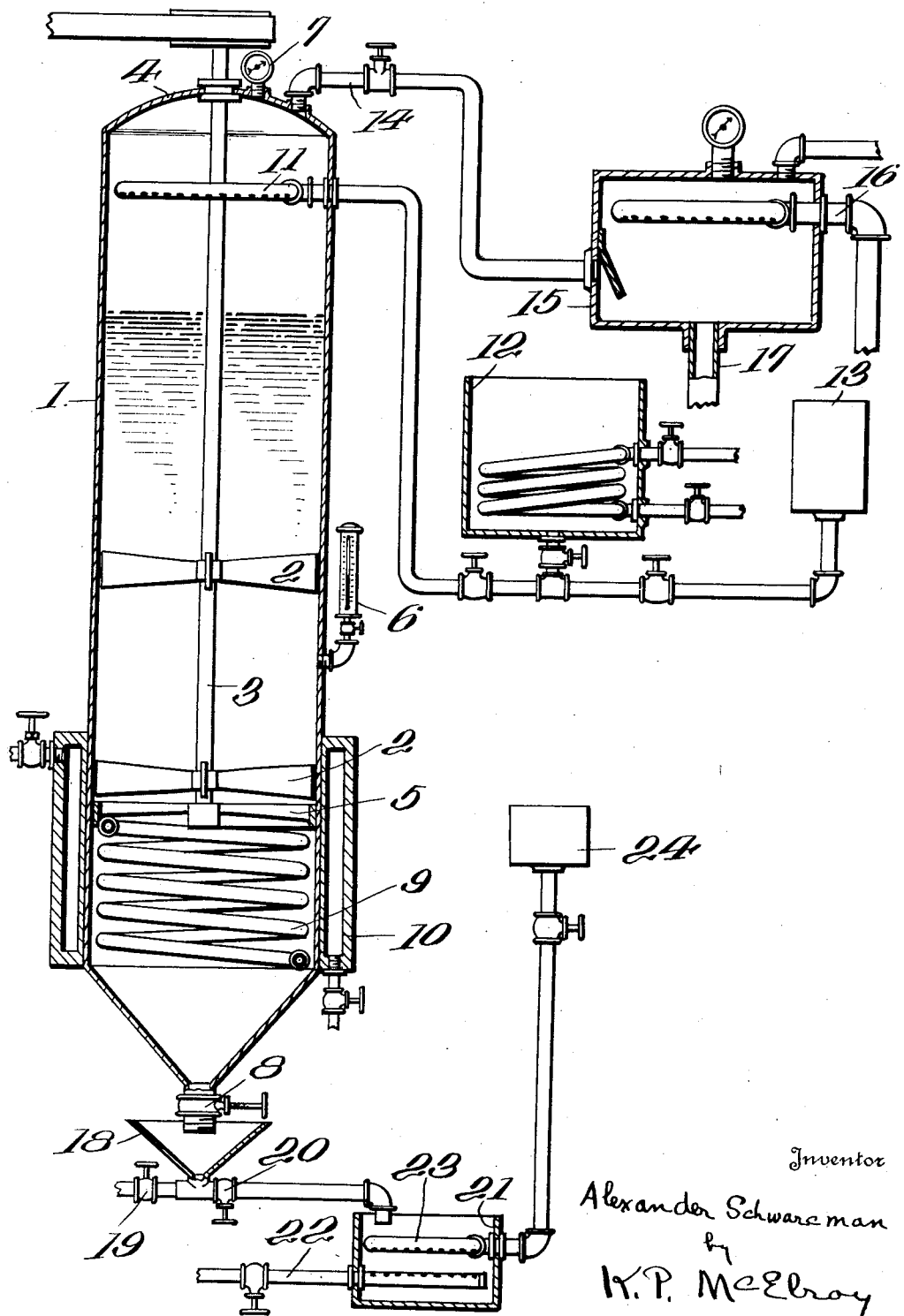

1,692,226

UNITED STATES PATENT OFFICE.

ALEXANDER SCHWARCMAN, OF BUFFALO, NEW YORK, ASSIGNOR TO SPENCER KELLOGG AND SONS, INC., OF BUFFALO, NEW YORK, A CORPORATION OF NEW YORK.

PROCESS OF TREATING OILS.

Application filed June 3, 1925. Serial No. 34,633.

This invention relates to processes of treating oils; and it comprises a method of purifying oils particularly adapted to the treatment of linseed oil and to the production of varnish oils therefrom, wherein the oil is agitated with a little aqueous caustic alkali solution, the addition being at a rather low temperature, say 70° F., and the amount of soda being about equal to the free fatty acids present, and is thereafter allowed to stand quiescent for a time, a little strong solution of silicate of soda is added and stirred into the oil, the oil being then raised in temperature and washed with successive additions of water at about its boiling point, the additions being allowed to settle and separate to remove water, etc., and washing being continued until the oil is substantially neutral and the hot or warm oil is finally dried under reduced pressure; all as more fully hereinafter set forth and as claimed.

Linseed oil and other vegetable oils are customarily refined by a treatment with caustic soda solution to remove free fatty acids and various other impurities. The caustic soda forms soaps that settle and carry down neutral oil to form "foots". The loss of oil in this way is considerable and many propositions have been made to obviate it. More caustic soda solution is usually added than corresponds chemically to the free fatty acids present; this excess being added for decolorization. Its use represents a further loss in neutral oil because of saponification. Finally, the alkali treated oil is ordinarily further purified with fuller's earth in an amount corresponding to the color present. This further earth treatment causes a further loss of oil.

In a prior Patent No. 1,372,631, March 22, 1921, to which reference is here made, I have described and claimed a method of effecting purification of vegetable oils, and particularly linseed oil whereby an efficient refining is caused with less loss of oil. The present invention in some of its aspects represents an improvement on the stated process. In the patented process I treated the oil with a little concentrated caustic soda solution in the cold, that is, around atmospheric temperature, under vigorous agitation. The amount of the caustic alkali used was about that which corresponds to the free fatty acids in the oil. With many commercial raw linseed oils, I used from 3 to 5 per cent of caustic soda solution; this soda solution varying from 14° to 25° Baumé. After the addition of the caustic soda, the oil and soda were vigorously agitated until a "break" was shown; that is, until there was a visible separation of solid matters, as indicated by testing externally of the reaction chamber. With this quantity of soda and under these conditions, efficient settling does not take place in the cold and if the mixture be heated and allowed to settle, the amount of neutral oil carried down will be very great. Therefore, in this operation, as soon as the oil has been treated with a desired quantity of alkali, the mixture was raised in temperature to about 180° F. and then washed with successive additions of small amounts of hot water, no stirring being done during these additions. The water in passing through the hot oil carries the soap with it and a good and clean separation of the resultant solution can be effected without much loss of neutral oil. Usually five or six washings were resorted to, using 5 or 6 per cent of water each time, except where the oil was unusually low grade, in which event somewhat more washing was necessary. Then the oil was dried under vacuum and finally decolorized with fuller's earth as usual.

The described prior process, while applicable to many other vegetable oils, such as cotton seed oil, cocoanut oil, etc., is particularly applicable to linseed oil and other drying oils. It is particularly useful in making high grade "varnish oils" from raw linseed oil.

In making refined oils from raw linseed oil there are a number of specific commercial products which can be here made. I have described the production of several of these in the acknowledged prior patent to which reference is here made.

I have now found that in the operation of the described prior process, the amount of neutral oil carried off by the foots can be still further lessened and the amount of fuller's earth finally required for decolorizing and from which the oil is finally separated can be diminished by the use of certain expedients. One of these expedients is to allow the oil to stand for some time, usually about an hour, in a quiescent state, after treatment with caustic alkali and before the hot washing treatments. Another is to add a small proportion of a strong solution of water glass to the mixture and stir it in just after the period of quiescence and just before the washing. This silicate of soda makes the soaps in the foots much more granular and lessens the occlusion of neutral oil. And in operating in the manner described, the amount of coloring matter carried down and away by the foots is much increased; I get a much lighter oil which requires considerably less fuller's earth in the final treatments; sometimes none.

The solution of silicate of soda used is usually a 40° Baumé solution of commercial water glass. Its amount should be about 0.5 per cent of the amount of caustic soda used.

In the accompanying illustration I have shown, more or less diagrammatically, certain apparatus capable of use in the performance of the present process, the illustration being in central vertical section with certain parts shown in elevation: In this showing Element 1 is a treatment vessel of iron, steel or other suitable material. It is interiorly provided with agitating means 2, carried by shaft 3, journaled in top 4 and on spider 5. The casing is provided with thermometer 6 and pressure gage 7. At its bottom, it tapers to valved coned outlet 8. An internal steam coil 9 and a steam jacket 10 are provided for heating purposes. Near the top and above the normal liquid level is a perforated liquid-introducing pipe 11. This communicates by a valved connection with hot water tank 12 and by another valved connection with tank 13 for holding caustic alkali and sodium silicate solution. As shown for convenience in illustration these tanks are at a relatively low level but in practice it is more convenient to locate them at a level above the top of vessel 1 to permit gravity feed. At the top of vessel 1 is valved pipe 14 leading to means for producing suction, here shown as a waterleg or barometric condenser 15 having a pipe 16 for introducing water spray; the downtake being shown at 17. Below the treating tank is receiving tank 18 provided with valved draw off means. As shown, by opening cock 19, dry neutral oil may be sent to a suitable place of use, while by opening valve 20 soap and washings can be sent to a special tank 21. This tank is provided with open steam pipe 22 and acid introducing means 23, drawing acid from elevated tank 24.

In the use of the above structure in the present process, container 1 is charged with a suitable quantity of an oil, usually linseed oil, although it may be another vegetable oil, such as cotton seed oil, cocoanut oil, palm oil, etc. The oil is usually at atmospheric temperature, say, around 60° to 70° F. It may be at a temperature a little higher or a little lower without much influencing the process. To this oil is added caustic soda solution from tank 13, this soda solution entering through pipe 11. Usually, the alkali solution is about 14° Baumé and is usually in amount corresponding to the acid content of the oil as shown by titration. It may be a little more or a little less, but ordinarily I seek a neutralization as exact as may be, using merely enough alkali to combine with the free fatty acids. The oil and soda solution are admixed by means of stirrer 2, vigorous agitation being performed until the oil shows a tendency to "break"; that is, until there is a visible separation of solid in a specimen removed for the purpose of testing. As soon as this occurs, the stirrer is stopped and the oil allowed to stand quiescent, while still at the ordinary temperature, for about an hour. During this time, there will be no great amount of settling of the foots, but the soaps formed will increase in particle size, or agglomerate. Coloring matter is taken up during this period of quiescense to a large extent. Then the stirrer is started and about 0.5 per cent of a 40° Baumé sodium silicate solution based on the amount of caustic soda used is added through 13 and 11. As soon as the incorporation is completed, the stirrer is stopped again and the oil heated up by means of 9 and 10 (either or both) to a temperature near but below the boiling point of water, 212° F. A temperature of about 180° F. is often the most desirable. When the oil is heated, water near the boiling temperature is introduced through 12 and 11, the introduced water descending through the oil as a sort of spray carrying down with it the disseminated soaps. The soap solution and washings accumulate in the coned bottom of the apparatus and are discharged by 8 into hopper 18 whence they are delivered by opening valve 20 into the soap receiving vessel 21. Here the soap solution may be heated by means of steam entering from 22, and it may be broken up by acid coming from 24 via 23. The increase in temperature serves to accelerate or to augment the reaction between the soaps etc., and the acid being added to produce free fatty acids and restore a definite acidity to the purified neutral oil.

Returning to the washing treatment, as much hot water is passed through the oil in the described manner as may be necessary to wash it to substantial neutrality. When washing is complete the oil is allowed to stand for a few minutes to allow separation of as much water as possible, this water being withdrawn at 8. The stirrer is then started and the oil is further heated by the steam heating means, the valve in line 14 being now opened and a flow of water sprayed into 15 from pipe 16. This operation serves to dry the oil, the water contained in the oil being vaporized and carried by pipe 14 to the condenser 15, where it is condensed, at the same time vacuumizing vessel 1 through pipe 14. When the oil is dried, the vacuum or suction is broken and dry oil is discharged through 8, passing to a suitable point of storage and after treatment through pipe 19. Sometimes, no treatment with fuller's earth is required but generally I give the purified dry oil a decolorizing treatment with fuller's earth, this serving to remove any little color which may be left. If acidity in the oil is wanted, the dry decolorized oil is given an addition of the acid oil produced in 21 by breaking up soaps with acid from 24.

What I claim is:—

1. The process of purifying vegetable oils which comprises agitating a body of such an oil with an aqueous caustic alkali solution in about the amount corresponding to the free fatty acids present, allowing the mixture to stand quiescent for a definite time less than that required to effect settling but sufficient to permit agglomeration of the solid soaps formed by the agitating action, raising the temperature of the oil to a point near but below 212° F., passing hot water therethrough in finely divided form until the oil is neutral, and removing the water solution.

2. The process of purifying vegetable oils which comprises agitating a body of such an oil with an aqueous caustic alkali solution in about the amount corresponding to the free fatty acids present, allowing the mixture to stand quiescent for a definite time less than that required to effect settling but sufficient to permit agglomeration of the solid soaps formed by the agitating action, adding a small proportion of silicate of soda solution, raising the temperature of the oil to a point near but below 212° F., passing hot water therethrough in finely divided form until the oil is neutral, and removing the water solution.

3. The process of purifying vegetable oils which comprises agitating a body of such an oil with an aqueous caustic soda solution in about the amount corresponding to the free fatty acids present, allowing the mixture to stand quiescent for a definite time less than that required to effect settling but sufficient to permit agglomeration of the solid soaps formed by the agitating action, raising the temperature of the oil to a point near but below 212° F., passing hot water therethrough in finely divided form and removing the water solution, washing with further portions of hot water in the same way until substantial neutrality is attained and drying the neutral washed oil in vacuo under heating conditions.

4. The process of purifying vegetable oils which comprises agitating a body of such an oil with an aqueous caustic soda solution in about the amount corresponding to the free fatty acids present, allowing the mixture to stand quiescent for a definite time less than that required to effect settling but sufficient to permit agglomeration of the solid soaps formed by the agitating action, adding a small proportion of silicate of soda solution, raising the temperature of the oil to a point near but below 212° F., passing hot water therethrough in finely divided form and removing the water solution, washing with further portions of hot water in the same way until substantial neutrality is attained and drying the washed oil in vacuo under heating conditions.

5. The process of purifying crude vegetable oils which comprises agitating a body of such oil with an aqueous solution of caustic soda in substantially the amount required to neutralize the free fatty acids present, allowing the oil to stand quiescent for about an hour and then adding a small amount of a solution of silicate of soda, to assist in clarifying the oil and to reduce the loss of neutral oil by occlusion in the foots, raising the temperature of the oil to approximately 180° F., then spraying water at a temperature approaching 212° F. in the oil to wash the impurities therefrom, until the oil is substantially neutral, permitting the water and oil to separate into layers, drawing off the water, and then drying the oil under vacuum during heating thereof.

In testimony whereof, I have hereunto affixed my signature.

ALEXANDER SCHWARCMAN.